(12) United States Patent
Loveder

(10) Patent No.: US 10,874,168 B2
(45) Date of Patent: Dec. 29, 2020

(54) FOOTWEAR SOLE

(71) Applicant: Wolverine Outdoors, Inc., Rockford, MI (US)

(72) Inventor: Christopher J. Loveder, Rockford, MI (US)

(73) Assignee: Wolverine Outdoors, Inc., Rockford, MI (US)

( * ) Notice: Subject to any disclaimer, the term of this patent is extended or adjusted under 35 U.S.C. 154(b) by 189 days.

(21) Appl. No.: 16/287,081

(22) Filed: Feb. 27, 2019

(65) Prior Publication Data
US 2019/0289960 A1    Sep. 26, 2019

Related U.S. Application Data

(60) Provisional application No. 62/645,997, filed on Mar. 21, 2018.

(51) Int. Cl.
| | |
|---|---|
| *A43B 13/18* | (2006.01) |
| *A43B 13/12* | (2006.01) |
| *A43B 3/00* | (2006.01) |
| *A43B 13/14* | (2006.01) |
| *A43B 13/04* | (2006.01) |

(52) U.S. Cl.
CPC .......... *A43B 13/183* (2013.01); *A43B 3/0057* (2013.01); *A43B 13/122* (2013.01); *A43B 13/141* (2013.01); *A43B 13/04* (2013.01)

(58) Field of Classification Search
CPC ... A43B 13/183; A43B 13/122; A43B 13/223; A43B 13/26; A43B 3/0057
See application file for complete search history.

(56) References Cited

U.S. PATENT DOCUMENTS

| | | | | |
|---|---|---|---|---|
| 5,337,492 A | * | 8/1994 | Anderie | A43B 13/181 36/114 |
| 5,639,074 A | * | 6/1997 | Greenhill | F16F 1/328 267/158 |
| 6,625,905 B2 | * | 9/2003 | Kita | A43B 13/12 36/25 R |

(Continued)

FOREIGN PATENT DOCUMENTS

| | | | |
|---|---|---|---|
| DE | 102015109369 A1 | 6/2015 | |
| DE | 102015109369 A1 * | 12/2016 | ........... A43B 13/186 |

(Continued)

*Primary Examiner* — Megan E Lynch
(74) *Attorney, Agent, or Firm* — Warner Norcross + Judd LLP

(57) ABSTRACT

A footwear having a shock attenuating and cushioning sole is provided, including a base to which first and second wave elements are joined, each element including alternating crests and troughs. The crests are wide and can each form a ground contact surface, whereas the troughs can be narrower than the crests. Crests of one element are disposed adjacent the troughs of another element. The widths of the crests to those of the troughs can be in at least a 2:1 ratio. Forward and rearward ends of the elements are connected to the base, and the troughs intermittently join with the base to secure the elements between the ends and to impair lateral movement. Different groups of wave elements can be grouped together to form a forefoot section, a heel section and/or an arch section, with the sections separated from and compressible independent of the other sections.

20 Claims, 6 Drawing Sheets

(56) References Cited

U.S. PATENT DOCUMENTS

| | | | |
|---|---|---|---|
| 6,675,500 B1* | 1/2004 | Cadamuro | A43B 1/0018 36/27 |
| 6,763,611 B1* | 7/2004 | Fusco | A43B 13/125 36/25 R |
| 9,451,805 B2 | 9/2016 | Barnes et al. | |
| 2003/0163933 A1* | 9/2003 | Krafsur | A43B 7/1425 36/27 |
| 2004/0111922 A1* | 6/2004 | Fusco | A43B 13/26 36/59 R |
| 2005/0126040 A1* | 6/2005 | LeVert | A43B 13/182 36/27 |
| 2007/0209230 A1* | 9/2007 | Dillon | A43B 13/183 36/25 R |
| 2007/0266593 A1* | 11/2007 | Schindler | A43B 1/0009 36/28 |
| 2009/0282700 A1* | 11/2009 | Dillon | A43B 5/06 36/88 |
| 2011/0138652 A1* | 6/2011 | Lucas | A43B 5/18 36/28 |
| 2012/0079747 A1* | 4/2012 | Seo | A43B 13/183 36/25 R |
| 2012/0167416 A1* | 7/2012 | Christensen | A43B 3/0057 36/103 |
| 2014/0026438 A1* | 1/2014 | Cortez | A43B 13/184 36/28 |
| 2014/0182170 A1* | 7/2014 | Wawrousek | A43B 5/06 36/103 |
| 2015/0027000 A1* | 1/2015 | Barnes | A43B 13/183 36/87 |
| 2015/0040428 A1* | 2/2015 | Davis | B29D 35/142 36/83 |
| 2015/0351493 A1* | 12/2015 | Ashcroft | A43D 1/025 36/132 |
| 2016/0051009 A1* | 2/2016 | Kormann | A43B 13/14 36/103 |
| 2018/0125148 A1* | 5/2018 | Elder | A43B 13/122 |

FOREIGN PATENT DOCUMENTS

| | | | |
|---|---|---|---|
| EP | 1234516 A2 | 8/2002 | |
| JP | 235202 A | 8/1999 | |
| WO | WO-0074515 A1 * | 12/2000 | A43B 13/183 |

* cited by examiner

FOOTWEAR SOLE

BACKGROUND

The present invention relates to footwear and, more particularly, to a footwear sole having exceptional shock attenuation, flexibility and energy return.

Footwear manufacturers strive to produce footwear having exceptional cushioning capabilities and shock attenuation, particularly in the design of athletic, walking and work footwear, where increased cushion and energy return are primary objectives, balanced with stability. Typically, such footwear include a specialized sole having extensive padding and/or a very thick sole. Such a sole is usually constructed from soft and/or compliant materials to provide cushioning and dampening characteristics. While this does provide cushioning and shock attenuation, it also can increase the volume and weight of the footwear significantly. Further, due to the soft material, the sole can tend to roll laterally and medially in some cases, which can render the footwear unstable on certain ground surfaces or for certain activities. Additionally, the soft material of the sole can degrade over time, decreasing its energy return. Lastly, where the soft material of the sole is marginally protected from the elements and abrasion, or where the soft material engages the ground, that material can wear quickly, decreasing the longevity of the footwear.

Some manufacturers have attempted to replace thick soles and/or thick padding with air bladders or shock attenuating pods in the heel. While these constructions can address prior issues, they also can present new issues. For example, air bladders can be punctured or can crack where materials flex over time. Thus, the bladders can leak, reducing their shock attenuation and rebounding capabilities. Shock pods can sometimes add additional weight to a sole unit, which can hinder its performance. Shock pods also can require extra manufacturing and assembly costs, as well as added complexity to integrate the pods into the footwear.

Although conventional footwear can include soles that provide cushioning and energy return, there remains a long felt and unmet need for footwear that provides these features as well as stability, durability and flexibility of the sole to enhance comfort.

SUMMARY OF THE INVENTION

A footwear configured to attenuate shock and provide energy return is provided, including a base to which multiple wave elements are joined, each element including alternating crests and troughs. The crests are wide and can form a ground contact surface in some cases, whereas the troughs are narrower than the crests. Crests of one element can be disposed adjacent the troughs of another element to provide enhanced force dissipation and energy return.

In one embodiment, wave elements can be grouped in sections in the heel, arch and/or forefoot of the sole. The wave elements can be joined with the base to secure the sections. For example, forward and rearward ends of the wave elements can be connected directly to the base. The ends of adjacent wave form elements can alternate between crests and troughs, each of which is attached to the base. Optionally, a preselected number of the troughs can be intermittently joined with the base to secure the wave elements to the base between the ends and to impair lateral movement of the elements and the sections.

In another embodiment, the widths of the crests to the widths of the troughs can be in a ratio that is at least 2:1, at least 3:1, at least 4:1 or other ratios. The resulting wider crests can provide suitably sized ground contact surfaces to enhance traction and to dissipate force. The narrower troughs can free up more are for the ground contact surfaces on the bottom of the sole, without impairing a spring-like function of the respective wave elements.

In still another embodiment, the crests of wave elements having a common frequency can be aligned with one another, across one or more lateral axes extending generally perpendicular to a longitudinal axis of the sole. These crests can flank a trough of other wave elements of different frequency disposed therebetween. The troughs of those other wave elements can be at a level closer to the base than the crests of the adjacent wave elements.

In yet another embodiment, different groups of wave form elements can be grouped together to form a heel section, an arch section and/or a forefoot section of the elements, with the sections separated from one another and compressible independent of one another. Optionally, the different sections can be separated by gaps between those sections. The gaps can extend upward to the base, in some cases exposing the base between the sections.

In still another embodiment, a multiple wave elements including the crests and troughs can be included in a particular heel, arch and/or forefoot section. A predetermined number of troughs can be joined with and/or can extend from the base. Another predetermined number of troughs can be free-floating relative to the base, and generally not connected to the base. The number of troughs connected to the base relative to the number of troughs not connected to the base can be an expressed ratio, for example, at least 1:1, at least 1:2, at least 1:3, at least 1:4, at least 1:5, or at least 1:10. The ratio can be suitable to prevent a section from detaching from the base, yet to ensure the section remains compliant to attenuate shock and/or provide energy return.

In even another embodiment, the crests of the wave elements can include pads or sections of tread or texture. The tread or texture can be disposed at the crests, optionally not in the troughs. The wave elements can be from a first material, and the tread or texture can be constructed from a durable, grippy material.

In a further embodiment, the base can be joined and/or integrally formed with a support cage that extends outwardly, along an exterior of an upper of the footwear. The support cage can extend to a lacing system of the footwear.

In yet a further embodiment, certain wave elements can be disposed adjacent one another and can have a common frequency so that crests of a first wave element are adjacent crests of a third wave element, with a second wave element disposed therebetween, the third wave element being of a different frequency. The first and third wave elements can include lateral and medial edges that mimic and follow edge wave forms. These edge wave forms can be configured so that edges of the first and third wave elements undulate toward and away from one another when viewing the footwear from a bottom plan view. Optionally, the edge wave forms can be of a wave shape that undulates toward and away from a longitudinal axis of the footwear.

In still a further embodiment, the second wave element can include lateral and medial edges that mimic and follow other edge wave forms. These other edge wave forms can be configured so that opposing edges of the second wave element each undulate and are generally parallel to a lateral edge of the first wave element and a medial edge of the third wave element, respectively, on opposite sides of the second wave element.

The current embodiments provide a novel footwear construction including a sole that is flexible, stable from side to side, yet can attenuate shock and provide exceptional cushioning and energy return.

These and other objects, advantages and features of the invention will be more readily understood and appreciated by reference to the detailed description of the preferred embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
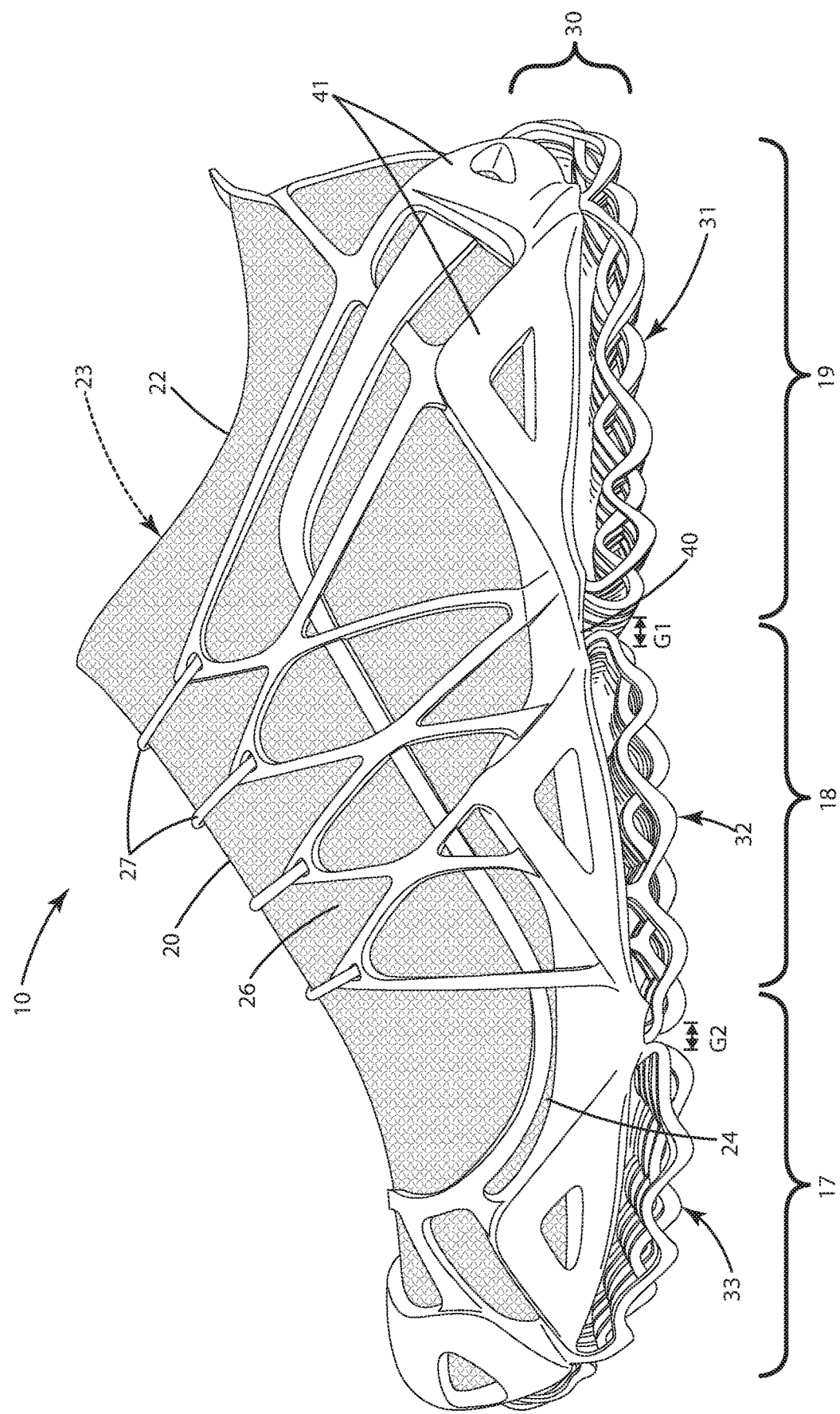
FIG. 1 is a side view of a current embodiment of the footwear.

Footwear constructed in accordance with a current embodiment is shown in FIGS. 1-7 and generally designated 10. Generally, the footwear 10 includes an upper 20 and a sole 30 joined with the upper. The sole 30 can include a longitudinal axis LA and a width W1, the width W1 spanning from a lateral side L to a medial side M across the longitudinal axis LA. The sole 30 can include a base 40 to which a support cage 50 is joined. The support cage 20 can extend upwardly along an exterior surface 22 of the upper. The sole 30 can include one or more sections comprising a plurality of wave elements 60. For example, the sole 30 can include a heel section 31, an arch or midfoot section 32 and a forefoot section 33. The wave elements 60 can include exemplary first wave element 61, second wave element 62 and third wave element 63. The wave elements can each include a plurality of respective crests and troughs, given the wave form shape of the wave elements 60.

Certain ones of the wave elements can have a common frequency and amplitude. For example, the crests and troughs of the first wave element 61 can align with and can be parallel to the crests and troughs of the third wave element 63 as described further below. The crests and waves of the second wave element 62, however, can be 180° out of sync with the frequency of the first and third wave elements. Thus, the first and third wave elements 61, 63 can provide a collective ground contact surface while the second wave element provides a trough in the same area, above the crests, and thus nearer to the base 40, optionally forming no part of the ground contact surface in that area between crests of the adjacent first and third wave elements.

Figure 3:
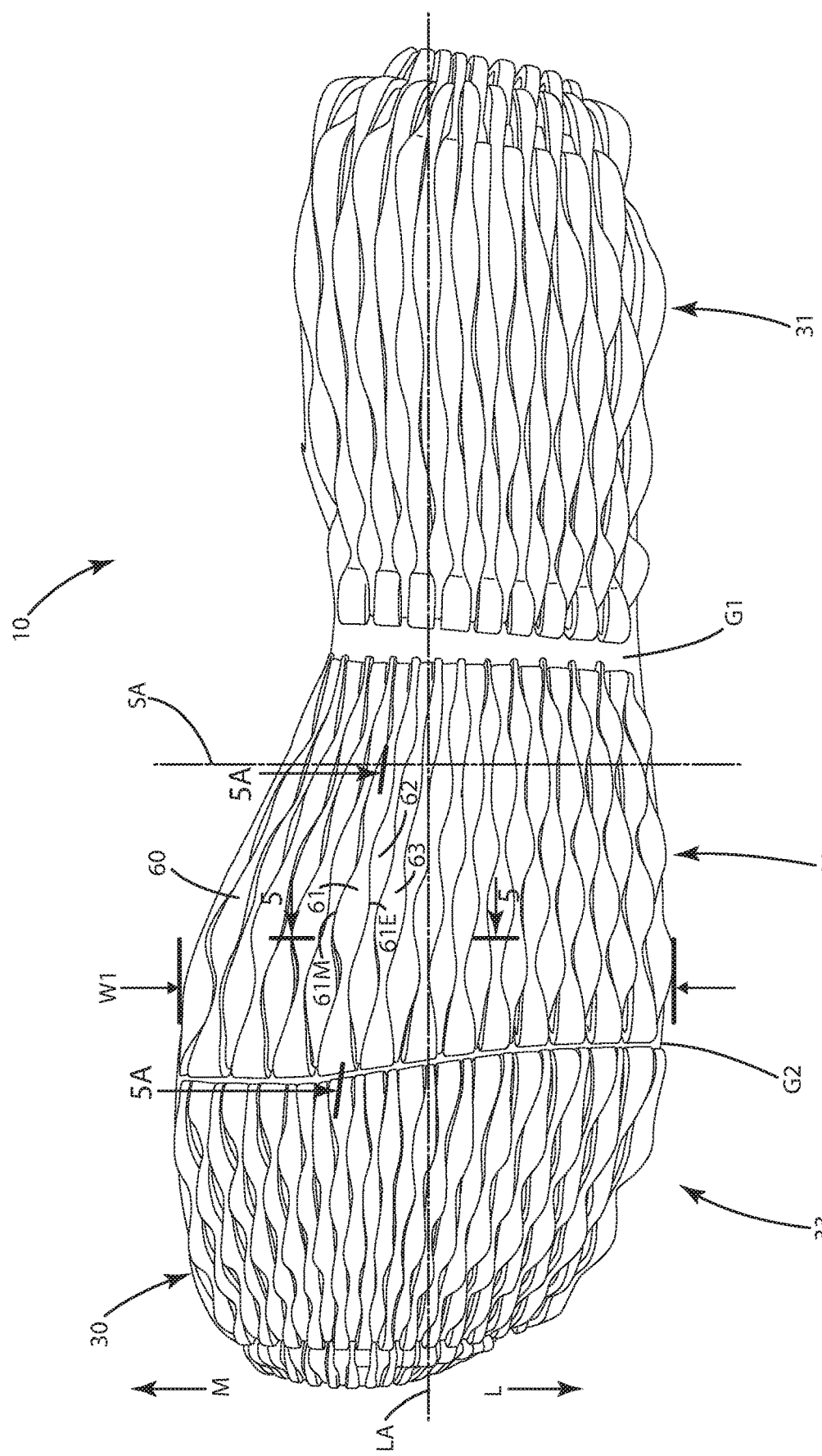
FIG. 3 is a bottom view of a sole of the footwear.

As shown in FIG. 3, a collection of multiple wave elements can alternate from crest to trough, to crest to trough, across a lateral or side-to-side axis SA, which extends perpendicular to the longitudinal axis LA of the sole and footwear. The collection of crests of the multiple wave elements can form a ground contact surface. When the sole 30 engages the ground, these crests are there to absorb and attenuate shock. The portions of the wave elements adjacent the crests and extending to the troughs compress slightly. Due to the wave form of these elements, they can function to dampen the compression of the sole unit. When they are fully compressed, the wave elements are slightly thinner from crest to trough. The wave elements thus also store and return energy to the sole and the wearer. The wave elements of the footwear can provide shock attenuation, cushioning, and dampening, as well as an acceptable level of energy return.

Although the current embodiment of footwear is illustrated in the context of a performance shoe, it may be incorporated into any type or style of footwear, including casual shoes, trail shoes and boots, hiking boots, work boots, all-terrain shoes, barefoot running shoes, athletic shoes, running shoes, sneakers, conventional tennis shoes, walking shoes, multisport footwear, boots, dress shoes or any other type of footwear or footwear components. It also should be noted that directional terms, such as "vertical," "horizontal," "top," "bottom," "upper," "lower," "inner," "inwardly," "outer", "outwardly," "below" and "above" are used to assist in describing the embodiments based on the orientation of the embodiments shown in the illustrations.

Further, the terms "medial," "lateral" and "longitudinal" are used in the manner commonly used in connection with footwear. For example, when used in referring to a side of the shoe, the term "medial" refers to the inward side, that is, the side facing the other shoe, and "lateral" refers to the outward side. When used in referring to a direction, the term "longitudinal direction" refers to a direction generally extending along the length of the shoe between toe and heel, and the term "lateral direction" refers to a direction generally extending across the width of the shoe between the medial and lateral sides of the shoe. The use of directional terms should not be interpreted to limit the invention to any specific orientation.

Additionally, as used herein, the term "arch region" (or arch or midfoot) refers generally to the portion of the footwear or sole assembly corresponding to the arch or midfoot of the wearer's foot; the term "forefoot region" (or forefoot) refers generally to the portion of the footwear forward of the arch region corresponding to the forefoot (for example, including the ball and the toes) of a wearer's foot; and the term "heel region" (or heel) refers generally to that portion of the footwear rearward of the arch region corresponding to the heel of the wearer's foot. The forefoot region 17, arch region or midfoot region 18 and heel region 19 generally are identified in FIG. 1. However, it is to be understood that delineation of these regions may vary depending upon the configuration of the sole assembly and/or footwear.

The upper 20 will only be described briefly here. It can be in the form of a knitted upper, constructed for example by weaving or knitting techniques, such as circular knitting, flat knitting, Jacquard knitting or other types of knitting. As illustrated, the upper can be a circular knitted upper forming a sock. It can include an ankle opening 22 and interior void 23 enclosed by the upper. The upper can include a lower portion 24 which can include a lower surface that engages the base 40. An example of a suitable upper construction is disclosed in U.S. Patent Application Publication 2018/0332920, filed Jul. 13, 2017, which is hereby incorporated by reference in its entirety. Optionally, although not shown, the footwear can be constructed to include an upper having multiple pieces of material joined together, and/or can include a footbed or insole disposed above a Strobel board, or a cement lasted construction depending on the application. The base 40 can include one or more elements of a support cage 41 that extend upwardly along an exterior surface 26 of the upper. The support cage 41 can extend forwardly and upwardly toward a lacing system 27 of the upper. The system can include a lace that connects one side of the support cage to an opposing side of the support cage on the other side of the upper 20.

With reference to FIGS. 2-7, the sole 30 can include multiple components. To begin, the sole can include the resilient, flexible base 40 which generally can extend under a lower portion of the upper 20 as mentioned above. The base can include an upper surface 40U and a lower surface 40L. The upper surface 40U can face toward the upper 20. The base 40 can extend as shown from the heel region 19, through the arch region 18 and into the forefoot region 17, optionally up to the toe bumper 45 of the footwear 10. As mentioned above, the base 40 can be joined with the support cage 50 that extends upwardly alongside the upper. The base 40 optionally can be integrally and monolithically formed with the support cage 50, as well as the heel, arch and forefoot sections. The sections 31, 32 and 33 can be integrally molded and/or 3D printed or otherwise formed as a single piece unit with the base and optionally the support cage. The base 40 can extend longitudinally a substantial portion of the longitudinal axis LA of the footwear. The base 40 also can extend laterally the full width W1 of the footwear taken at any location along the length of the footwear. The base also can extend from the lateral side L to the medial side M of the footwear, substantially across the width and substantially along the length of the footwear. The base, support cage where included, as well as the wave elements described below can be flexible due to the material from which these components are constructed. For example, these components can be constructed from polymers, rubber, synthetic or natural, thermoplastic polyurethane, polyester, and/or sufficiently durable and wear-resistant material, for example, polyurethane, polyvinyl chloride, thermoplastic rubber, composite materials and/or combinations thereof.

Optionally, the base 40 can be constructed from relatively thin piece of material, optionally less than 1.0 mm thick, further optionally less than 2.5 mm thick, yet further optionally less than 5.0 mm thick, to minimize the weight of the footwear 10.0. This thin structure can be implemented due to the cushioning and shock attenuation characteristics of the wave elements joined with the base. The base 40 optionally can be contoured to follow the contours of a bottom of a wearer's foot and/or the undersurface of the upper 20.

Further optionally, when included the support cage 50 can be constructed from a material similar to that of the base. In some cases, these components can be monolithic and one piece. The support cage can be semi-rigid and flexible, which means that it can be self-supporting and can project upwardly from the base, yet still form and hold a general shape on its own without significantly folding downward onto the base or outward away from the upper. Again, in the finished footwear, the support cage 50 can extend upward from the base, generally adjacent the exterior of the upper 20.

Figure 2:
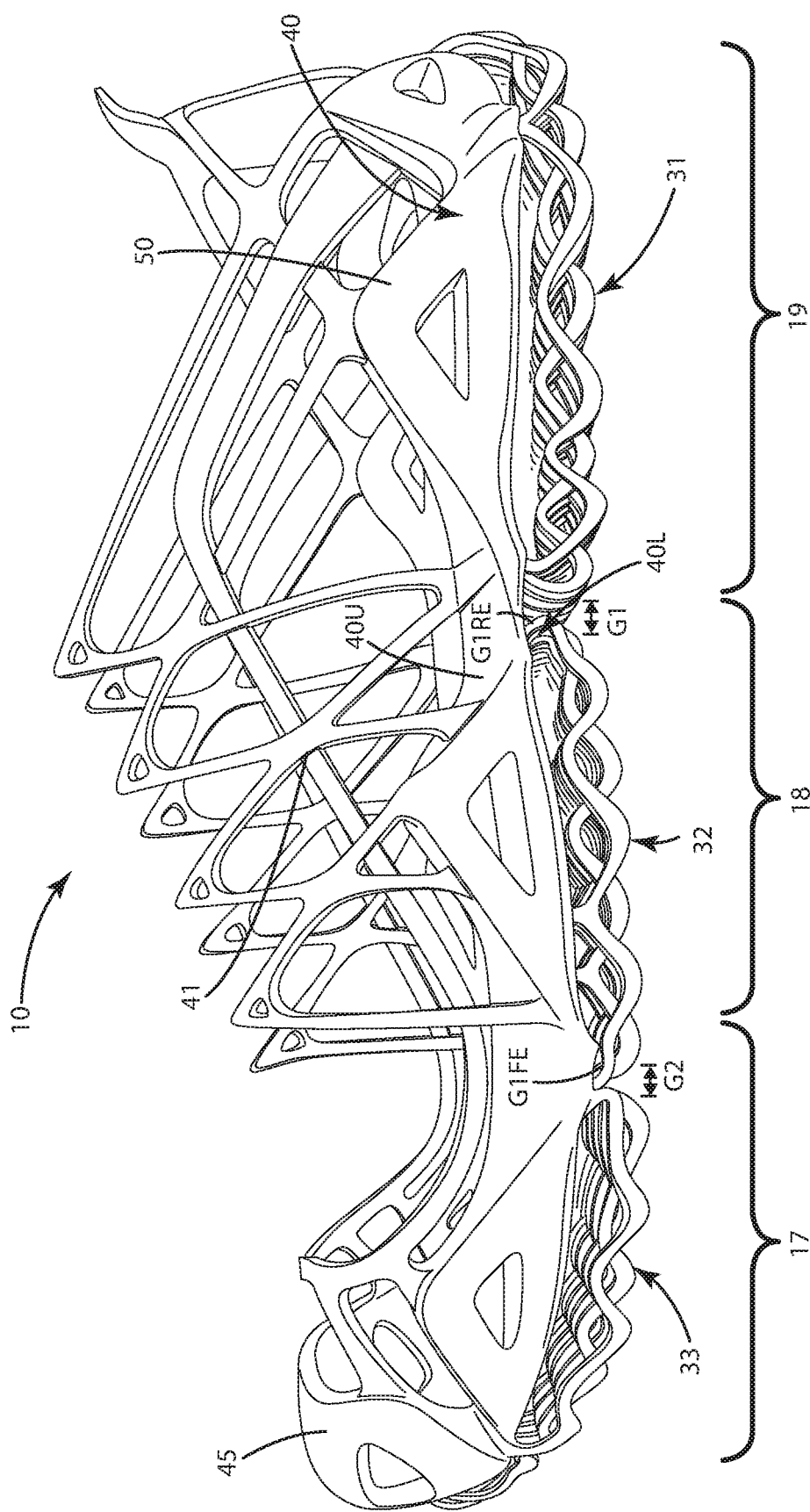
FIG. 2 is another side view of the footwear with an upper removed.
Figure 4:
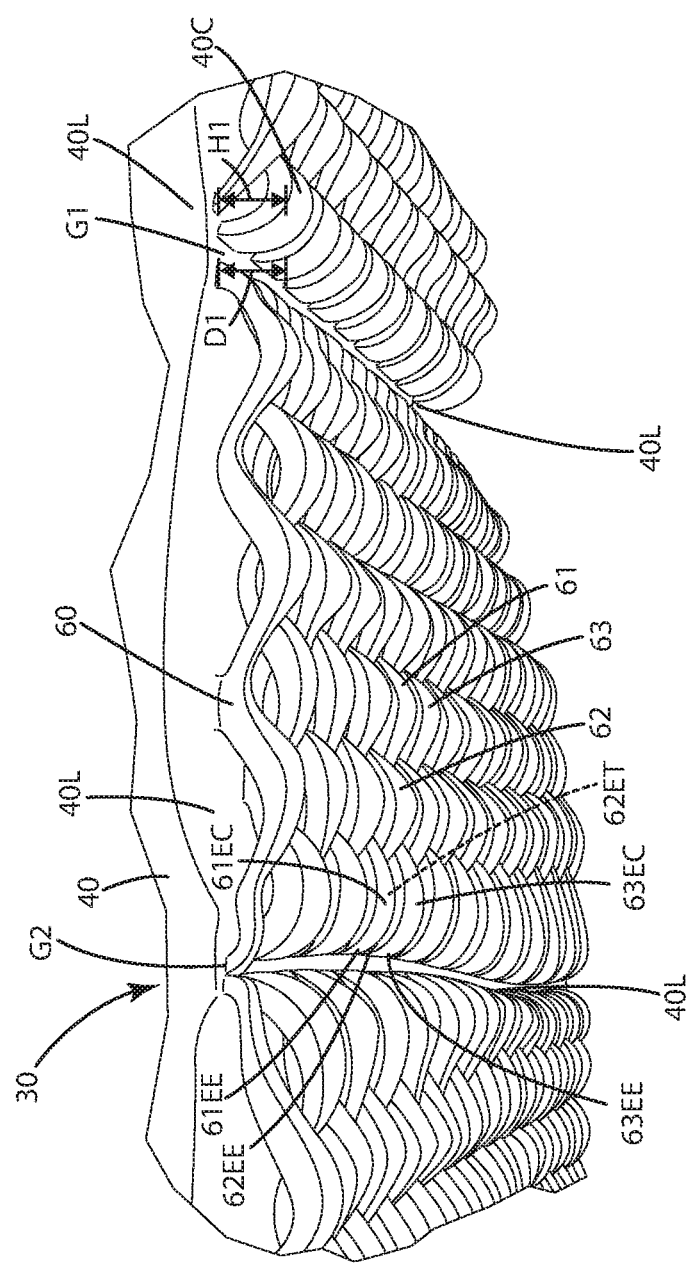
FIG. 4 is a bottom perspective view of the sole.

As shown in FIGS. 2-4, the base 40 can include a lower surface 40L on which multiple wave elements 60 can be disposed. These wave elements can be divided up into different, independent sections. As mentioned, above the sections can include a heel section 31, an arch or midfoot section 32 and a forefoot section 33. These sections can be separated from one another by gaps between the sections and the respective wave form elements so the sections and their wave forms function somewhat independent of one another. For example, gap G1 can separate the heel section 31 from the midfoot section 32. The gap G2 can separate the midfoot section 32 from the forefoot section 33. Each of these sections can include wave elements that are attached at their ends and/or intermittently along the wave elements as described below to the base. Indeed, these sections and the respective wave elements can be integrally formed, fastened, or otherwise joined with the base and in particular the lower surface or other portions of the base 40 depending on the application.

The gaps G1 and G2 can separate the exemplary sections 31, 32 and 33 respectively. These gaps can be open gaps that expose the lower surface 40L of the base 40 through the gaps as shown in FIG. 4. The gaps G1 and G2 can be of a depth equal to a height of a crest of a wave element adjacent the gap. For example, referring to gap G1, the depth D1 of that gap G1 can be equal to a height H1 of a wave element immediately adjacent the gap G1. This height H1 can be measured from the lower surface 40L of the base to the top of the crest 40C in that area. Of course, other measurements can be taken in different areas to compare the depth and the height.

Although shown as including three sections 31, 32 and 33 separated by gaps, the sections alternatively can be contiguous with one another, without gaps being formed therebetween. In some cases, however the gaps G1, G2 can be utilized to separate the different sections to provide more flexibility to the base and the sole in general. Optionally, the different sections can be constructed from wave elements that include different materials to provide different properties to the different sections, such as stiffness, cushion, energy return, etc. Further, the different sections can include different types of ground contact surfaces on the wave elements to provide different traction or different contours in different regions. Further optionally, the precise locations where the gaps are located can vary, also to provide different flexibility, traction and function of the sole.

As mentioned above, the different sections 31, 32 and 33 can include one more of wave elements. Because many of the wave elements of each section can be similar, only a few of the wave elements shown in the arch section 32 will be described here. These wave elements can extend across the width W1 of the footwear, and along a length thereof, optionally within certain regions. The wave elements can include a first wave element 61 adjacent a second wave element 62 which is further adjacent a third wave element 63.

These wave elements can approximate a wave form having crests and troughs along a length of the elements. While the wave forms of the respective wave elements 61, 62 and 63 can approximate a sinusoidal wave form, these wave elements can take on different wave forms and shapes. For example, the wave elements can comprise multiple partial arcs or half circles, connected end-to-end one another along the length of the wave element. In other cases, the wave forms having a wave element can include multiple triangular shapes, with the crests having angles formed at them, and the troughs likewise forming angles between segments of the wave elements. Regardless of their precise shape, the wave elements can function somewhat like a spring. When compressed, the crests can be pushed toward the base, and some of the troughs can slide and/or move, in some cases, relative to the base. In some cases, the crests of the wave elements can be considered arc-like shapes. When those arcs are compressed or flattened upon engagement of ground contact surface thereof with the ground, the arcs flatten, and in so doing, absorb energy and provide cushion and dampening through the footwear 10. The wave elements also can absorb energy, storing that energy so that upon removal of a ground contacting force, the wave elements can return energy to the sole and thereby push the user away from the ground. This in turn provides energy return during a gait cycle of the user.

With reference to FIGS. 3-5A, the first wave element 61 can extend adjacent and optionally substantially parallel to the longitudinal axis LA the footwear 10. The first wave element 61 can extend in a direction generally perpendicular to the lateral side-to-side axis SA of the footwear. The first wave element 61 can include a plurality of first crests 61C and first troughs 61T, 61TA. These crests and troughs can alternate with one another, generally progressing crest to trough, crest to trough, crest to trough. This type of pattern can be referred to as alternating first crests and first troughs herein.

Figure 5:
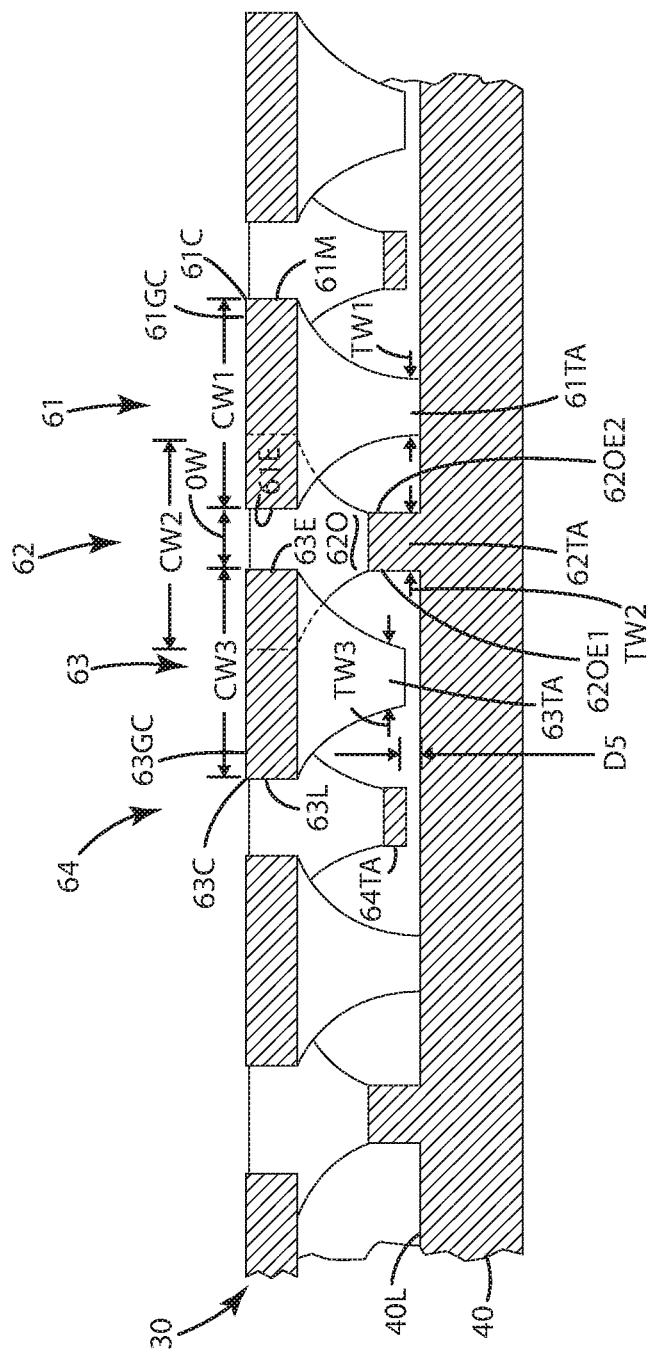
FIG. 5 is a section view of the sole taken along lines 5-5 in FIG. 3.
Figure 5A:
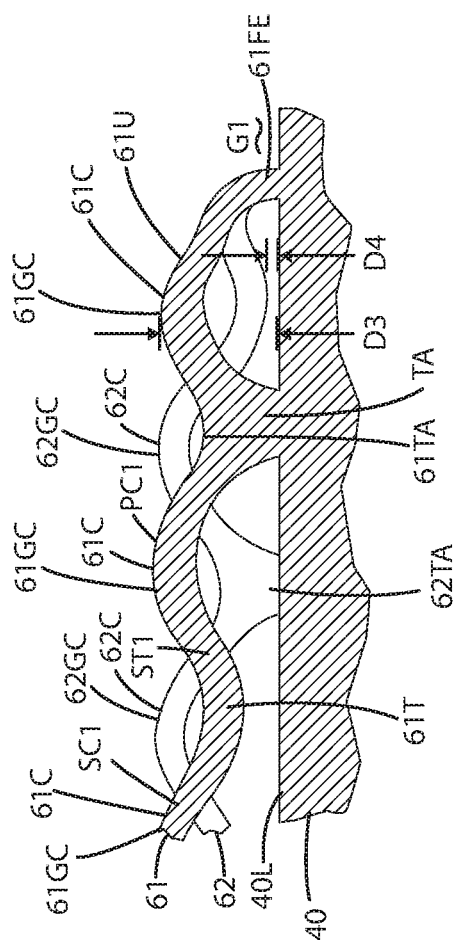
FIG. 5A is a section view of the sole taken along lines 5A-5A in FIG. 3.
Figure 6:
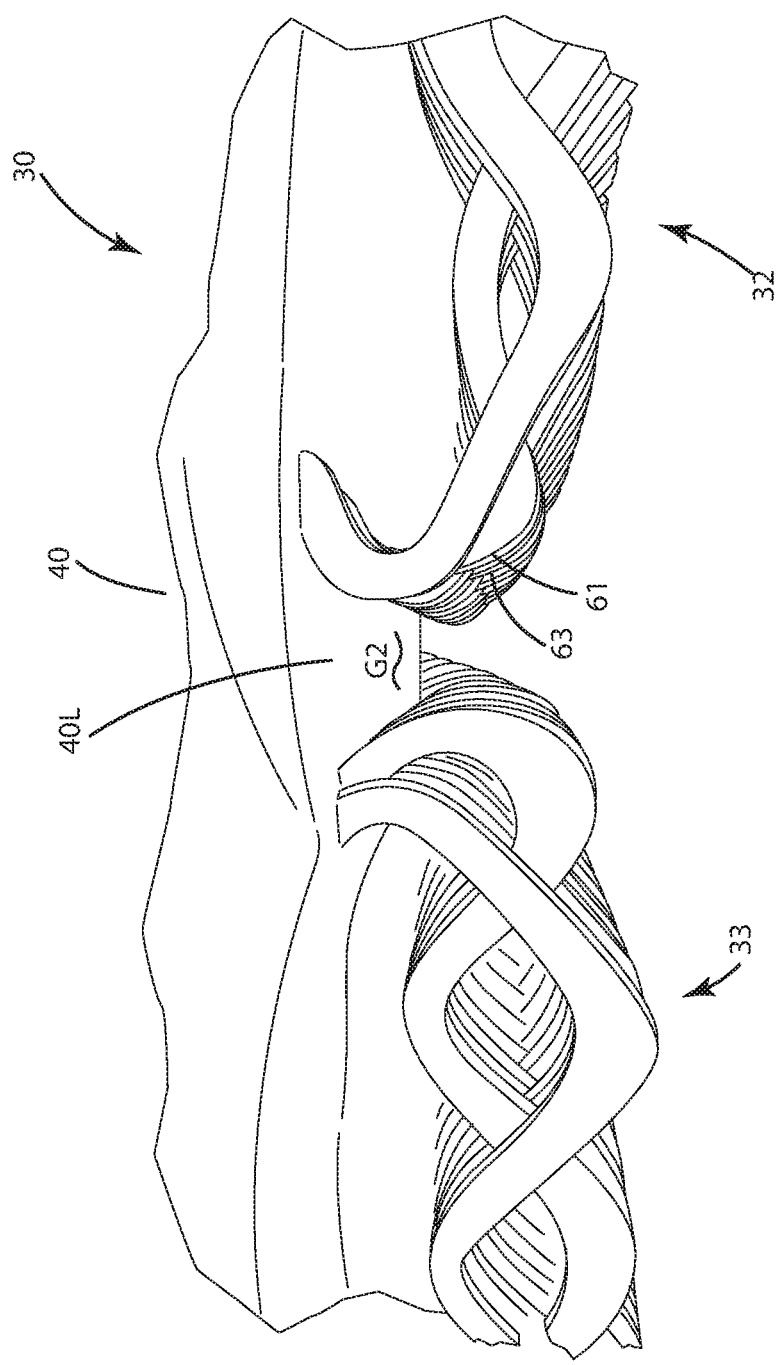
FIG. 6 is a close up view of a gap between a heel section of wave elements and an arch section of wave elements.

As shown in FIGS. 5-5A, the first wave element 61, and in particular, its first crests 61C can include ground contact surfaces 61GC. These ground contact surfaces 61GC can be configured to directly contact a ground surface when the sole 30 engages the ground, for example, as a user walks with the footwear 10. The ground contact surface 61GC and the crests 61C optionally can be contoured or can include surface features. For example, the ground contact surface 61GC can be textured or treaded to improve the traction and aesthetic appeal of the footwear. In some cases, although not shown, the ground contact surface 61GC and the crests 61 can include a separate piece of material, such as a rubber pad or tread that forms a portion of or is generally joined with the crests 61C to form the ground contact surface 61GC. Regardless of whether the crests include a separate piece of material, or are of a unitary piece of material with the remainder of the wave element 61, they are still considered to include a ground contact surface configured to directly contact the ground surface. If added, the separate piece of material can itself include a tread pattern, texture and/or siping to improve traction.

With reference to FIGS. 5-5A, the first wave element 61 can be constructed to include crests 61C and troughs 61T, 61TA having different or equal widths. For example, the first crests 61C can include a first crest width CW1 which is measured transverse to the longitudinal axis LA and parallel to the side-to-side axis SA. The first troughs 61T, 61TA can also define a width TW1 taken transverse to the longitudinal axis and parallel to the side-to-side axis SA. The first crest width CW1 can be greater than the first trough width TW1.

Optionally, the wave element 61, when extending from the troughs 61T, 61TA to the adjacent crests 61C can increase in width, generally tapering to a wider width from the trough width TW1 to the crests width CW1. The tapering can increase gradually near the bottom of the troughs, and then increase rapidly as the wave element approaches the crests.

In some cases, the ratio of the crest width CW1 to the trough width TW1 can be established to enhance traction of the sole and dissipate impact energy, and yet provide sufficient compression of the respective wave elements relative to the base for cushioning. The ratio of the crest widths CW1 to the trough width TW1, measured in millimeters can be optionally at least 2:1, further optionally at least 3:1, yet further optionally at least 4:1, still further optionally at least 5:1, yet further optionally between 2:1 and 10:1, or other ratios depending on the application.

Optionally, the first wave element 61 can include a first upper surface 61U, as shown in FIG. 5A. This upper surface 61U can extend continuously and uninterrupted from a primary first trough PT1 to a primary first crest PC1 to a secondary first trough ST1 to a secondary first crest SC1. The primary first crest and secondary first crest can be of a first crest width CW1. The primary first trough and secondary first trough can be of a first trough width TW1. The upper surface 61U can widen in transitioning from the primary first trough to the primary first crest and likewise from the secondary first trough to the secondary first crest. The first upper surface also can narrow in transitioning from the primary first crest to the secondary first trough. Other wave elements, such as the third wave element can include similar tapering, widening and/or narrowing upper surfaces as the first upper surface 61U.

As mentioned above, the first wave element 61 can be of an elongate structure extending generally the length of the arch section 32. This first wave element 61 can terminate at a first forward end 61FE and at a first rearward end 61RE. These ends can be distal from one another. The first forward end 61FE can be closer to the forefoot region 17 or the forefoot section 33 than the first rearward end 61RE. Likewise, the first rearward end 61RE can be closer to the heel region 19 and heel section 31 than the forward end 61FE. Each of the ends can be joined directly to the base 40 of the lower surface 40L of the base. In some cases the base and ends can be integrally formed as a monolithic, single piece unit, for example by those pieces and components being molded or printed directly to one another. In other cases, the ends can be glued, welded, cemented, fastened or otherwise secured to the base and optionally its lower surface. With this type of connection at the forward and rearward ends of the wave element 61, that wave element can connect to and can be anchored to other adjacent wave elements as described below. As also described below, the adjacent wave elements 62 and 63, or any other wave elements, can include similarly formed forward ends and rearward ends to anchor the elements the base.

As mentioned above, the first wave element 61 can be one of many wave elements. For example, the sole 30 can also include the second wave element 62 extending adjacent the longitudinal axis LA, and alongside and/or generally parallel to and immediately adjacent the first wave element 61. The second wave element optionally might not be joined with, and can be disposed a preselected distance from, the first wave element along the entire length of each of the first and second wave elements. This is so that the first and second wave elements can function as springs, independent of one another. Of course, in some cases, the first and second wave elements can be intermittently joined with one another by a connecting member. These elements, however might not be joined substantially along their lengths, as this may in some cases impair cushioning capabilities of each independent wave element.

Optionally, the first and second wave elements can be distal from and not intertwined with one another. For example, the second wave element optionally might not extend through any portion of the first wave element. That is, there are no holes or apertures defined in the first wave element, with the second wave element or a portion thereof extending through those holes or apertures. This way, the first second wave elements optionally do not include portions that may collide with one another, or otherwise collapse upon one another, which might impair their independent movement and ability to compress and provide shock attenuation and/or energy return. The second wave element G2 can include multiple alternating crests 62C with respective ground contact surfaces 62GC similar to those described above. Each of these second crests 62C can include second crest widths CW2 similar to the first crest width CW1 described above, and can have a similar relationship to a trough width TW2, like that of the trough width TW1 to crest width CW1 associated with the first wave element 61 described above. The crest widths CW2 of the second crests 62C can be greater than the second trough widths TW2 in the second wave element 62. Further, as noted above, the second crest width CW2 can have a special ratio relative to the second trough width TW2, similar and/or identical to the ratios noted above, comparing the first crest width CW1 to the first trough width TW1.

As shown in the side views of FIGS. 4 and 5A, the first crests 61C can be aligned with the second troughs 62T, 62TA when viewed from that side perspective. The first crests 61C can appear to be located above the second troughs 62T, 62TA, with the apexes of each first crest and second trough generally aligned with and/or in a similar position relative to one another. The first crests 61C can be disposed a first distance D3 from the base 40, above the lower surface 40L of the base. The second troughs can be disposed a second distance D4 from the lower surface 40L of the base 40. The first distance D3 can be greater than the second distance D4. These distances can be expressed as a ratio of D3 to D4 of optionally at least 2:1, further optionally at least 3:1, yet further optionally at least 4:1, even further optionally between 1:1 and 10:1.

Similarly, the first troughs 61T, 61TA can be aligned with the second crests 62C of the second wave element 62. The first troughs 61T, 61TA can be closer to the base lower surface 40L than the second crests 62C. The distance of the second crest to the base can be similar to distance D3, while the distance of the troughs 61T, 61TA to the base 40 can be similar to the distance D4 mentioned above. Relationships between these distances also can have the ratios mentioned above.

In some applications, the sections can be configured so that the wave elements points of attachment to the base, in addition to the forward ends and rearward ends of the wave elements. For example, a predetermined number the first troughs and second troughs, optionally less than all of the first troughs and all of the second troughs, can be joined with the base. This is illustrated via the attached first troughs 61TA attached second troughs 62TA in FIGS. 5-5A. There, the troughs 61TA and 62TA are attached directly to the base 40. These attached troughs can be integrally formed and monolithic with the base 40. The placement of these attached troughs can vary, depending on the particular section and the target properties of the sole. As mentioned above, optionally less than all of the first troughs and second troughs are connected to the base. In turn, the wave elements can remain somewhat free relative to the base, and can compress and rebound freely. The predetermined number of first troughs and second troughs joined with the base also can impair the wave elements from moving laterally and longitudinally relative to the base. This in turn can offer more stability, preventing and/or impairing the sections between the respective ends of the wave elements from sliding and moving, or in some cases tearing off the base due to substantial lateral shear forces exerted on the connections between the wave elements and the base. Not all of the first troughs and the second troughs might be joined with the base. For example, the troughs 63T of third wave element 63 can be spaced a distance D5 from the lower surface 40L of the base 40. Another adjacent trough 64T of a fourth wave element 64 can likewise be spaced the same distance D5 from the base. These troughs can be generally free from attachment to the base. The distance D5 can be a small distance, for example, optionally 0.1 mm to 5 mm, further optionally 0.5 mm to 2 mm, and further optionally less than 1 mm, depending on the application.

The sole 30 can include multiple additional wave elements, such as the third wave element 63. This third wave element 63 can be similar to the first wave element, with the crests 63C of the third wave element aligned with the crests 61C of the first wave element 61. These crests can include a third crests width CW3 that is similar to the first crests width CW1. The third crest 63C and the third wave element 63 can be placed closer to the longitudinal axis LA than the second wave element 62 and the first wave element 61. The second wave element 62 can be disposed between the first wave element 61 and the third wave element 63. The third wave element 63 can include a third trough width TW3 that is similar to the second trough width TW2.

As shown in FIG. 5, each third crest 63C of the third wave element 63 can be placed or disposed across an opening 620 (located over each second trough 62T, 62TA) from each respective first crest 61C. In this case, the edges 61E and 63E of the wave elements 61 and 63 can force one another across the opening 620. The opening 620 can have a width OW that is equal to or slightly greater than the second width of the trough TW2 and optionally less than crest width CW2 of the crests 62C of the second wave element 62, as well as crests of the first and third wave elements. Generally, the first wave element 61 and third wave element 63 can be separated from one another along the length of each of the first wave element and the third wave element, with the second wave element located therebetween. The opening 620 between the first wave element and the third wave element thus can vary in width. That is, the width opening OW can become greater when the crest widths CW1 and CW3 decrease, as the first crest and third crest transition toward the adjacent first trough and third trough, respectively.

The crests and troughs of the respective first 61, second 62 and third 63 wave elements can terminate at the respective forward and/or rearward ends of those wave elements. For example, as shown in FIGS. 3-4, the first wave element 61 can include a first forward end 61FE. The second wave element 62 can include a second forward end 62FE and the third wave element 63 can include a third forward end 63FE. The first forward end can include a first end crest 61EC, the second forward end 62FE can include a second end trough 62ET, and the third wave element 63 and third forward end 63FE can include a third end crest 63EC. The first end crest 61EC can be adjacent the second end trough 62ET, the third end crest 63EC can be adjacent the second end trough 62ET, the second end trough 62ET located between the third end crest 63EC and the first end crest 61EC. Optionally, the second end trough 62ET can be hidden substantially between the first and third end crests where it attaches to the base at the forward ends of the wave elements. The attachment of the end crests, however, to the base can be visible in the gap G2. It will be appreciated with this configuration, the first forward end, second forward end and third forward end terminate adjacent one another to form a forward end of the arch section. Likewise, the first rearward end, second rearward end and third rearward end of the respective wave elements terminate adjacent one another to form a rearward and of the arch section. Of course, where these wave elements are disposed in different sections, for example, the heel section and/or the forefoot section, the respective forward and rearward ends of the wave elements can likewise terminate adjacent one another and form respective forward and rearward ends of those other sections.

As mentioned above, each of the first wave element 61, second wave element 62 and third wave element 63 can be incorporated into any of the heel section, arch section and/or the forefoot section. Various features of the wave elements also can be reproduced in all the respective sections. For example, the first second and third wave elements can be reproduced with all the respective features described herein as fourth, fifth and sixth wave elements in the heel section. Alternatively, those same wave elements can be reproduced in the forefoot section and can include common features and characteristics as described above.

Optionally, as shown in FIGS. 3 and 5, the first 61, second 62 and third 63 wave elements can include lateral and medial edges that mimic and follow edge wave forms. For example, the first wave element 61 can include a lateral edge 61E and a medial edge 61M. The third wave element 63 can include a medial edge 63E and a lateral edge 63L. The edge 61E of the first wave element 61 and the edge 63E of the third wave element 63 can undulate toward and away from one another when viewing the footwear from the bottom view of FIG. 3. In this configuration, the edges of the first and third wave elements also can follow wave forms, with crests and troughs projecting toward and away from one another. The crests of the edges of the first wave element can be aligned with the crests of the edges of the third wave element. The crests of the edges 61E can project toward edges 63E below the troughs 62T, 62TA of the second 62 wave element between the first 61 and third 63 wave elements. In some cases, the second wave element 62 can include lateral and medial edges as well that mimic and follow other edge wave forms. These other edge wave forms can be configured so that opposing edges 62OE1 and 62OE2 of the second wave element each undulate and are generally parallel to edge 61E of the first wave element and edge 63E of the third wave element, respectively, on opposite sides of the second wave element 62.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual elements of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. An article of footwear comprising:
   an upper;
   a sole joined with the upper, the sole comprising:
      a longitudinal axis and a width, the width spanning from a lateral side to a medial side disposed across the longitudinal axis from the lateral side;
      a base extending from a heel region toward a forefoot region of the footwear;
      a first wave element extending adjacent the longitudinal axis, the first wave element including a plurality of alternating first crests and first troughs, the first crests each having a first crest width transverse to the longitudinal axis, and a ground contact surface configured to directly contact a ground surface when the sole engages the ground, the first troughs each having a first trough width transverse to the longitudinal axis, the first crest width being greater than the first trough width, the first wave element terminating at a first forward end and at a first rearward end, distal from the first forward end, the first forward end and the first rearward end joined with the base;
      a second wave element extending adjacent the longitudinal axis and alongside and immediately adjacent the first wave element, without extending through any portion of the first wave element, the second wave element including a plurality of alternating second crests and second troughs, the second crests each having a second crest width transverse to the longitudinal axis, and a ground contact surface configured to directly contact a ground surface when the sole engages the ground, the second troughs each having a second trough width transverse to the longitudinal axis, the second crest width being greater than the second trough width, the second wave element terminating at a second forward end and at a second rearward end, distal from the second forward end, the second forward end and the second rearward end joined with the base;

wherein the first crests are aligned with the second troughs, but farther from the base than the second troughs, wherein the first troughs are aligned with the second crests, but closer to the base than the second crests, wherein a predetermined number of the first troughs and the second troughs, less than all of the first troughs and the second troughs, are joined with the base to impair at least one of the first wave element and the second wave element from moving laterally relative to the longitudinal axis.

2. The article of footwear of claim 1, wherein the first forward end includes a first end crest, wherein the second forward end includes a second end trough, wherein the first end crest is adjacent the second end trough.

3. The article of footwear of claim 2, comprising:

a third wave element extending immediately adjacent the second wave element, without extending through any portion of the second wave element, the third wave element including a plurality of alternating third crests and third troughs, the third crests each having a third crest width transverse to the longitudinal axis, and a ground contact surface configured to directly contact a ground surface when the sole engages the ground, the third troughs each having a third trough width transverse to the longitudinal axis, the third crest width being greater than the third trough width, the third wave element terminating at a third forward end and a third rearward end, the third forward end and the third rearward end joined with the base, wherein each third crest is disposed across an opening over each second trough from each respective first crest.

4. The article of footwear of claim 3, wherein the third forward end includes a third end crest, wherein the third end crest is adjacent the second end trough, with the second end trough located between the third end crest and the first end crest.

5. The article of footwear of claim 4, wherein the first wave element, the second wave element and the third wave element form a heel section of the sole located in the heel region of the footwear, wherein the first forward end, second forward end and third forward end terminate adjacent one another to form a heel forward end of the heel section, wherein the first rearward end, second rearward end and third rearward end terminate adjacent one another to form a heel rearward end of the heel section.

6. The article footwear of claim 5, wherein the base is joined with a support cage extending upward therefrom adjacent a portion of the upper.

7. The article of footwear of claim 1, wherein the predetermined number of the first troughs and the second troughs are integrally formed with the base, wherein the first forward end and the second rearward end are each integrally formed with the base as a single piece unit.

8. The article of footwear of claim 1, wherein the first wave element includes a first upper surface, wherein the first upper surface extends continuously from a primary first trough to a primary first crest to a secondary first trough to a secondary first crest, wherein the primary first crest and secondary first crest are of the first crest width, wherein the primary first trough and secondary first trough are of the first trough width, wherein the first upper surface widens in transitioning from the primary first trough to the primary first crest.

9. The article of footwear of claim 8, comprising:

a third wave element extending immediately adjacent the second wave element, without extending through any portion of the second wave element, the third wave element including a plurality of alternating third crests and third troughs, the third crests each having a third crest width transverse to the longitudinal axis and a ground contact surface configured to directly contact a ground surface when the sole engages the ground, the third troughs each having a second trough width transverse to the longitudinal axis, the third crest width being greater than the second trough width, wherein the third wave element includes a third upper surface, wherein the third upper surface extends continuously from a primary third trough to a primary third crest to a secondary third trough to a secondary third crest, wherein the primary third crest and secondary third crest are of the first crest width, wherein the secondary third trough and secondary third trough are of the first trough width, wherein the third upper surface widens in transitioning from the primary third trough to the primary third crest, wherein the first wave element and third wave element are separated from one another along a length of each of the first wave element and the third wave element by the second wave element.

10. The article of footwear of claim 1, wherein a ratio of the first crest width to the first trough width is at least 2:1, whereby the first crest width is configured to bear a load when the first crests engage the ground surface.

11. An article of footwear comprising:

an upper;

a sole joined with the upper, the sole comprising:

a base extending from a heel region toward a forefoot region of the footwear;

a first wave element including a plurality of alternating first crests and first troughs, the first crests each having a first crest width and a ground contact surface, the first troughs each having a first trough width;

a second wave element extending alongside the first wave element, without extending through any portion of the first wave element, the second wave element including a plurality of alternating second crests and second troughs, the second crests each having a second crest width and a ground contact surface;

wherein the first crests are aligned with the second troughs, but farther from the base than the second troughs, wherein the first troughs are aligned with the second crests, but closer to the base than the second crests, wherein a predetermined number of the first troughs and the second troughs, less than all of the first troughs and the second troughs, are joined with the base to impair at least one of the first wave element and the second wave element from moving laterally relative to the longitudinal axis, wherein a ratio of the first crest width to the first trough width is at least 2:1.

12. The article of footwear of claim 11,
wherein the first wave element and second wave element each approximate a sinusoidal wave.

13. The article of footwear of claim 12, comprising:
a third wave element extending alongside the second wave element, the second wave element including a plurality of alternating third crests and third troughs, the third crests each having a third crest width and a ground contact surface;
wherein the third crests are aligned with the second troughs, but farther from the base than the second troughs,
wherein the third troughs are aligned with the second crests, but closer to the base than the second crests,
wherein the second troughs are between the third crests and the first crests,
wherein the second crests are between the first troughs and the third troughs.

14. The article of footwear of claim 13, comprising:
a semi-rigid support cage extending upward from the base along an exterior of the upper toward a lacing.

15. The article of footwear of claim 11, comprising:
a third wave element extending alongside the second wave element, the second wave element including a plurality of alternating third crests and third troughs, the third crests each having a third crest width and a ground contact surface,
wherein the second wave element is disposed between the first wave element and the third wave element,
wherein the first, second and third wave element each terminate at a respective forward end and a respective rearward end,
wherein the first, second and third wave element form a heel section of the sole located in the heel region.

16. The article of footwear of claim 15, comprising:
a fourth wave element including a plurality of alternating fourth crests and fourth troughs;
a fifth wave element extending alongside the fourth wave element, the fifth wave element including a plurality of alternating fifth crests and fifth troughs;
a sixth wave element extending alongside the fifth wave element, the sixth wave element including a plurality of alternating sixth crests and sixth troughs;
wherein the fifth wave element is disposed between the fourth wave element and the sixth wave element,
wherein the fourth, fifth and sixth wave element each terminate at a respective forward end and a respective rearward end,
wherein the fourth, fifth and sixth wave element form a forefoot section of the sole located in the forefoot region,
wherein the forefoot section is separated from the heel section.

17. The article of footwear of claim 16,
wherein the forefoot section and the heel section are spaced from one another a first distance,
wherein the base is exposed in at least one gap defined in the sole.

18. An article of footwear comprising:
an upper;
an outsole joined with the upper, the outsole comprising:
a base extending from a heel region toward a forefoot region of the footwear;
a first wave element including a plurality of alternating first crests and first troughs, the first crests each having a first crest width, the first troughs each having a first trough width, the ratio of the first crest width to the first trough width being at least 2:1;
a second wave element extending alongside the first wave element, without extending through any portion of the first wave element, the second wave element including a plurality of alternating second crests and second troughs, the second crests each having a second crest width, the second troughs each having a second trough width, the ratio of the second crest width to the second trough width being at least 2:1;
a third wave element extending alongside the second wave element so the second wave element is between the first and third wave elements, the third wave element including a plurality of alternating third crests and third troughs, the third crests each having a third crest width, the third troughs each having a third trough width, the ratio of the third crest width to the third trough width being at least 2:1,
wherein each of the first and third crests are aligned with each of the second troughs, but farther from the base than the second troughs,
wherein each of the first and third troughs are aligned with each of the second crests, but closer to the base than the second crests.

19. The article of footwear of claim 18,
wherein a predetermined number of the first troughs are joined directly with the base to impair at least the first wave element from moving laterally relative to the base.

20. The article of footwear of claim 18,
wherein the first wave element includes a lateral edge and a medial edge,
wherein the lateral edge and the medial edge each mimic a wave form,
wherein the lateral edge and medial edge undulate away from and toward one another.

* * * * *